United States Patent
Biller et al.

(10) Patent No.: US 11,737,599 B2
(45) Date of Patent: Aug. 29, 2023

(54) HEATED DOME FOR FOOD SERVICE

(71) Applicant: EGC OPERATING COMPANY LLC, Chardon, OH (US)

(72) Inventors: Brian Christopher Biller, Mentor, OH (US); Michael Bartos, Painesville, OH (US); Richard L. Dudman, Lenoir, NC (US)

(73) Assignee: EGC OPERATING COMPANY LLC, Chardon, OH (US)

( * ) Notice: Subject to any disclaimer, the term of this patent is extended or adjusted under 35 U.S.C. 154(b) by 625 days.

(21) Appl. No.: 16/334,481

(22) PCT Filed: Sep. 21, 2017

(86) PCT No.: PCT/US2017/052684
§ 371 (c)(1),
(2) Date: Mar. 19, 2019

(87) PCT Pub. No.: WO2018/057718
PCT Pub. Date: Mar. 29, 2018

(65) Prior Publication Data
US 2021/0289986 A1 Sep. 23, 2021

Related U.S. Application Data

(60) Provisional application No. 62/397,409, filed on Sep. 21, 2016.

(51) Int. Cl.
*A47G 23/06* (2006.01)
*A47J 41/00* (2006.01)
(Continued)

(52) U.S. Cl.
CPC ...... *A47J 36/2494* (2013.01); *A47G 23/0683* (2013.01); *A47J 47/14* (2013.01); *B32B 5/02* (2013.01); *B32B 5/18* (2013.01); *B32B 5/245* (2013.01); *B32B 5/26* (2013.01); *A47G 2023/0691* (2013.01); *B32B 2260/021* (2013.01); *B32B 2260/04* (2013.01); *B32B 2262/0246* (2013.01); *B32B 2262/0261* (2013.01); *B32B 2262/0269* (2013.01); *B32B 2262/0276* (2013.01); *B32B 2262/062* (2013.01); *B32B 2262/08* (2013.01); *B32B 2262/101* (2013.01); *B32B 2262/106* (2013.01); *B32B 2266/0207* (2013.01); *B32B 2266/0278* (2013.01); *B32B 2307/304* (2013.01)

(58) Field of Classification Search
CPC ............... A47G 23/0683; A47G 19/02; A47G 2023/0691; A47J 47/14; A47J 41/0044; A47J 36/2494; B32B 5/245; B32B 5/26; B32B 2262/106; B32B 2307/304
See application file for complete search history.

(56) References Cited

U.S. PATENT DOCUMENTS

4,530,344 A * 7/1985 Iyengar ................. A47J 36/06
206/508
4,541,411 A 9/1985 Woolf
(Continued)

*Primary Examiner* — Joanna Pleszczynska
(74) *Attorney, Agent, or Firm* — TAROLLI, SUNDHEIM, COVELL & TUMMINO L.L.P.

(57) ABSTRACT

A food delivery apparatus includes a domed shell that defines an interior space. A thermal storage device is secured to the shell so as to direct heat downward to food within the interior space.

32 Claims, 10 Drawing Sheets

(51) Int. Cl.

| | |
|---|---|
| *A47J 36/24* | (2006.01) |
| *A47J 47/14* | (2006.01) |
| *B32B 5/24* | (2006.01) |
| *B32B 5/26* | (2006.01) |
| *B32B 5/02* | (2006.01) |
| *B32B 5/18* | (2006.01) |

(56) References Cited

U.S. PATENT DOCUMENTS

| | | | | |
|---|---|---|---|---|
| 4,908,238 | A | * | 3/1990 | Vigo ............... D01F 1/00 |
| | | | | 427/389 |
| 5,520,103 | A | | 5/1996 | Zielinski et al. |
| 5,565,132 | A | | 10/1996 | Salyer |
| 5,894,953 | A | * | 4/1999 | Ramirez ......... B65D 51/1627 |
| | | | | 220/785 |
| 5,954,984 | A | | 9/1999 | Ablah et al. |
| 6,197,438 | B1 | * | 3/2001 | Faulkner ............ A47J 27/022 |
| | | | | 428/627 |
| 6,504,135 | B2 | | 1/2003 | Clothier et al. |
| 6,514,362 | B1 | | 2/2003 | Zuckerman et al. |
| 6,516,747 | B1 | | 2/2003 | Willinger |
| 6,657,170 | B2 | * | 12/2003 | Clothier ............... H05B 6/105 |
| | | | | 297/180.12 |
| 2006/0196497 | A1 | | 9/2006 | Dean |
| 2008/0047956 | A1 | | 2/2008 | Dudman |
| 2011/0284566 | A1 | | 11/2011 | Segal |
| 2016/0209124 | A1 | | 7/2016 | Da Silvaa et al. |

* cited by examiner

HEATED DOME FOR FOOD SERVICE

RELATED APPLICATIONS

This application claims priority to International Appln. No. PCT/US2017/052684, filed Sep. 21, 2017, and U.S. Provisional Appln. No. 62/397,409, filed Sep. 21, 2016, the entirety of which are incorporated herein by reference.

TECHNICAL FIELD

The present invention relates generally to food service and, more specifically, relates to a domed food delivery apparatus with a thermal storage device.

BACKGROUND

Food delivery systems are used to keep prepared food warm during transport to the end user in, for example, hospitals. Changes in temperature and humidity can lead to undesirable condensation on the inside of the delivery system cover, which can negatively affect food quality. More specifically, during use condensation can form on the underside of the cover positioned over the food, which then drips down on the food, reducing its desirability.

SUMMARY OF THE INVENTION

In one example, a food delivery apparatus includes a domed shell that defines an interior space. A thermal storage device is secured to the shell so as to direct heat downward to food within the interior space.

In another example, a food delivery apparatus includes a domed shell having an inner portion and an outer portion secured together to define a chamber therebetween. The inner portion defines an interior space. A thermal storage device is positioned in the chamber so as to direct heat downward to food within the interior space. A heat spreader is positioned between the inner portion and the thermal storage device for evenly distributing heat downward from the thermal storage device to the food. A thermal insulation layer is positioned between the outer portion and the thermal storage device.

DETAILED DESCRIPTION

Figure 1:
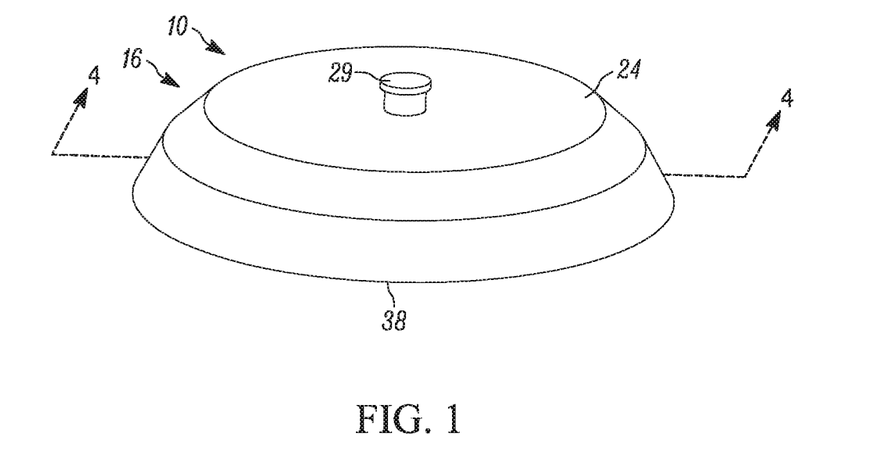
FIG. 1 is a top view of a food delivery apparatus in accordance with the present invention.
Figure 2:
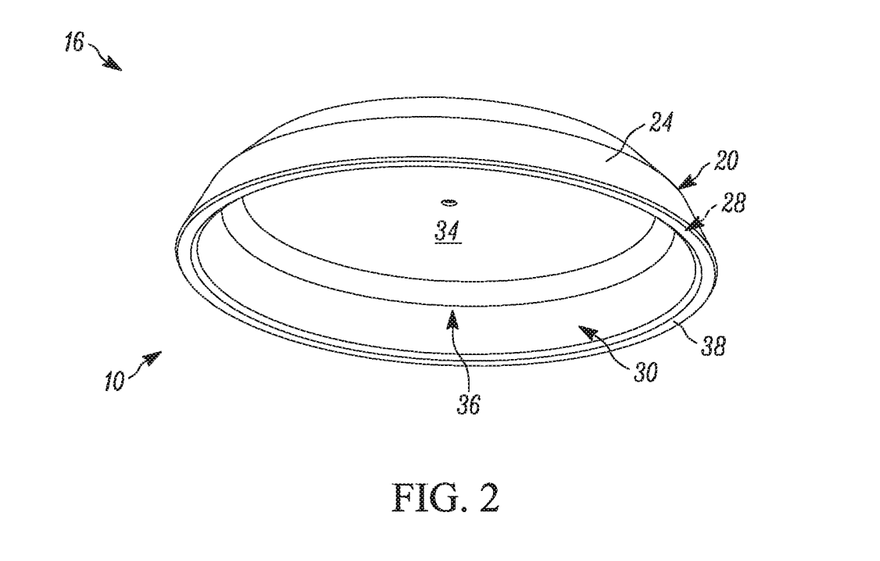
FIG. 2 is a bottom view of the food delivery apparatus of FIG. 1.
Figure 3:
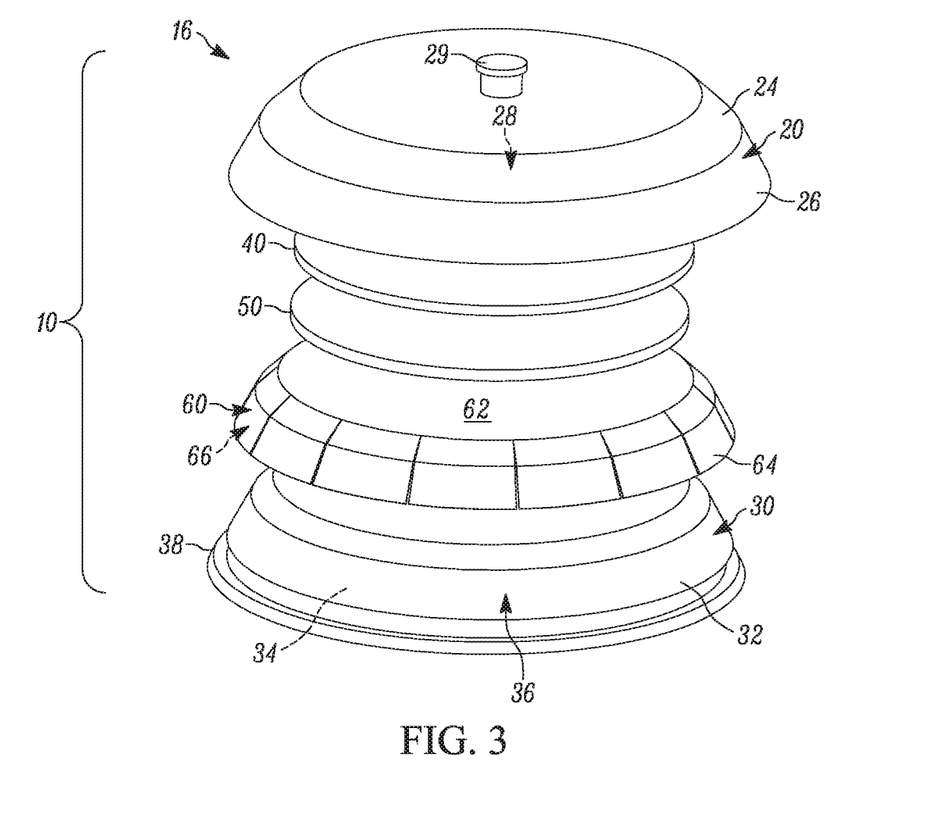
FIG. 3 is an exploded view of the food delivery apparatus of FIG. 1.

The present invention relates generally to food service and, more specifically, relates to a domed food delivery apparatus with at least one thermal storage device. FIGS. 1-4 illustrate an example food delivery apparatus 10 in accordance with the present invention. Referring to FIGS. 1-3, the apparatus 10 includes a shell 16 having a first, outer portion 20 and a second, inner portion 30. The outer portion 20 has a curved, arcuate or hemispherical shape and includes an outer surface 24 and an inner surface 26 that defines an interior space 28 (see also FIG. 4). Alternatively, the outer portion 20 could have a square or rectangular shape to form a box-shaped dome (not shown). The surfaces 24, 26 can extend generally parallel to one another. A projection or handle 29 extends upward from the outer surface 24.

Figure 4:
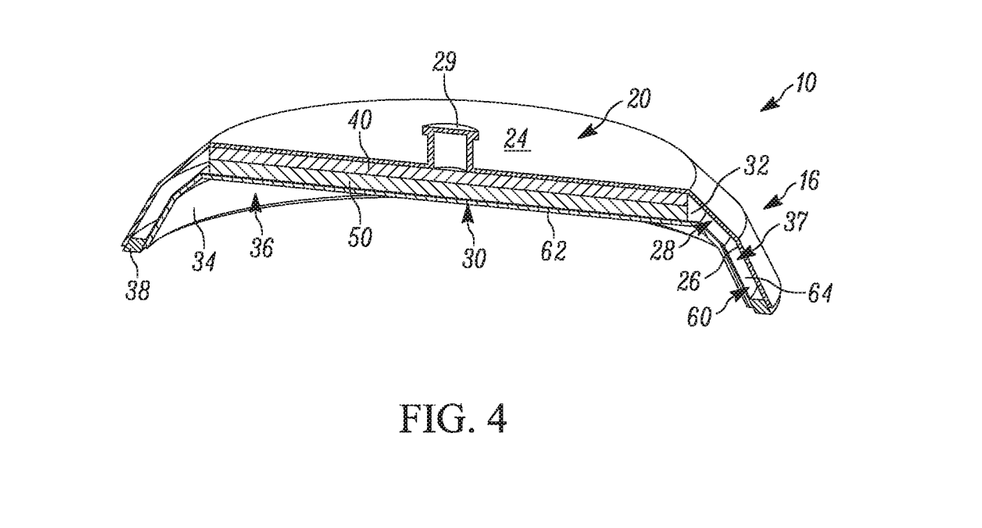
FIG. 4 is a section view of the food delivery apparatus of FIG. 1. taken along line 4-4.

The inner portion 30 has a curved, arcuate or hemispherical shape similar to the outer portion 20. The inner portion 30 includes an outer surface 32 and an inner surface 34 that defines an interior space 36 (FIG. 2). The surfaces 32, 34 can extend generally parallel to one another. The inner portion 30 is sized and shaped to fit within the interior space 28 of the outer portion 20 such that the portions are generally concentric with one another (FIG. 4). The inner and outer portions 20, 30 can be made from durable materials, such as polymers and/or metals.

A foot 38 is secured to the bottom of the inner portion 30 and the bottom of the outer portion 20 to connect the portions 20, 30 together and define a chamber 37 between the portions. The foot 38 can be formed from one or more elastomer(s), e.g., rubber, and fluidly seals the chamber 37 between the portions 20, 30. As a result, the shell 16 is constructed to prevent moisture and other contaminants from entering the chamber 37. The foot 38 also acts to mitigate or prevent relative movement between the shell 16 and any component on which the shell rests, i.e., the foot acts as an anti-skid member.

A thermal insulation layer 40, thermal storage device 50, and thermal heat spreader 60 are provided in the chamber 37 between the outer portion 20 and the inner portion 30. As shown, the thermal storage device 50 is provided in the chamber 37 between the thermal insulation layer 40 and the heat spreader 60, although other arrangements are contemplated. One or more of the components 40, 50, 60 can be omitted (not shown).

Referring to FIG. 4, when the food delivery apparatus 10 is assembled, the outer portion 20 and inner portion 30 cooperate to encapsulate the thermal insulation layer 40, thermal storage device 50, and heat spreader 60 within the chamber 37. The thermal insulation layer 40 abuts the inner surface 26 of the outer portion 20 and is positioned between the thermal storage device 50 and the inner surface 26. Alternatively, the thermal insulation layer 40 can be spaced from the inner surface 26. The thermal insulation layer 40 can be formed from any insulative material, such as a high temperature material, e.g., foam rubber, expanding urethane foam, fiberglass insulation, silica cloth or other insulation materials. In any case, the thermal insulation layer 40 acts to reduce heat loss from the chamber 37 outward through the outer portion 20

Figure 5:
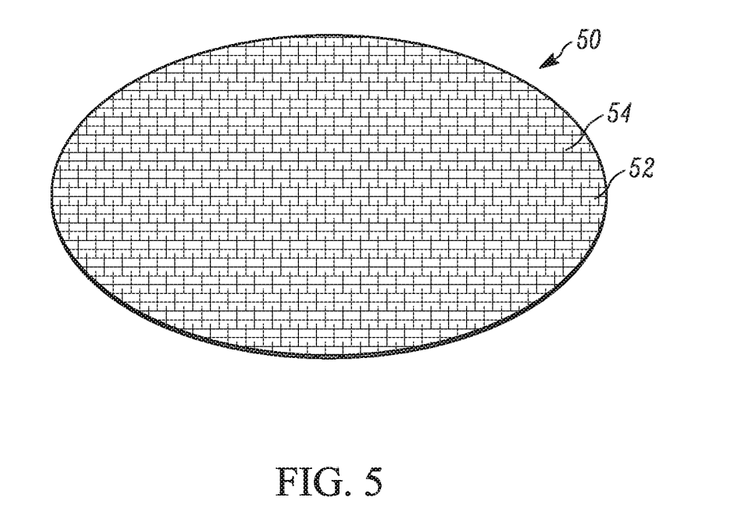
FIG. 5 illustrates a single layer thermal storage device of the food delivery apparatus of FIG. 1.

In one example shown in FIG. 5, the thermal storage device 50 constitutes a composite material that includes a fabric base 52 and one or more phase-change materials 54 provided on the base. Other example thermal storage devices are described in International Appln. No. PCT/US16/44613, filed Jul. 29, 2016, the entirety of which is incorporated by reference herein.

The fabric base 52 can be any man-made or natural fabric which is adsorbent and capable of withstanding high temperatures. Example fabrics can include, but are not limited to, fiberglass, carbon fiber, silica, cotton, polyester, wool, linen, acrylic, aramid, basalt, and nylon.

The fabric base 52 can have a loose or tight weave woven in any pattern depending on the application. In one example, the fabric base 52 can utilize chopped strand mat materials (CSM) having fibers laid randomly across each other and held together by a binder, e.g., a polyester-based or styrene-based binder. CSM can include fiberglass chopped strand mat, fiberglass continuous strand mat, fiberglass continuous strand veil, carbon fiber mat, carbon fiber continuous strand veil, aramid veil, and aramid mat.

The phase-change material 54 can be any substance with a high heat of fusion at a certain temperature and capable of storing and releasing large amounts of energy when melted and solidified. In one example, the phase-change material 54 constitutes a sugar alcohol that includes at least one of methanol, arabinitol/arabitol, erythritol, fucitol/L-fucitol, galactitol, dulcitol, iditol/D-iditol, inositol, isomalt, lactitol, lactitol (monohydrate), maltitol, maltotetritol, mannitol, palatinitol, pentaerythritol, polyglycitol, ribitol, sorbitol, threitol, volemitol, and xylitol.

The phase-change material 54 reacts to temperature fluctuations by storing and releasing thermal energy in response to cyclically heating and cooling the phase-change material. That said, the specific phase-change material(s) 54 chosen for the thermal storage device 50 is selected based on its melting point, specific heat, thermal stability, latent heat of fusion, decomposition temperature, and/or cost.

The fabric base 52 acts to contain, and provide structural stability for, the phase-change material 54. In the case of sugar alcohol 54, this structural stability helps prevent the formation of large crystals in the sugar alcohol during heating and cooling. As a result, flexibility in the thermal storage device 50 is greatly enhanced while helping to eliminate undesirable, audible noise during crystallization/cooling of the sugar alcohol.

A combination of phase-change materials 54 can be used to specifically tailor the heating and cooling profiles of the thermal storage device 50. For example, a first sugar alcohol infused into the fibers can be chosen to quickly drive up and hold the thermal storage device 50 temperature by rapidly adsorbing any heat applied thereto. After energy within the thermal storage device 50 is dissipated and the first sugar alcohol allowed to cool and solidify, a second sugar alcohol infused into the fibers could remain melted to hold the thermal storage device at a lower, more desirable temperature. In other words, multiple sugar alcohols with different melting points can be infused into the fabric base 52 such that the heat is dissipated in stages corresponding with the different melting points until the thermal storage device 50 reaches a desired temperature.

The particular phase-change materials 54 chosen should also be thermally stable, i.e., there should be no change in the melting temperature and latent heat storage capacity of the phase-change material 54 as the thermal storage device 50 is repeatedly cycled through heating and cooling phases. For example, it is known that sugar alcohols dulcitol and D-mannitol have low thermal stability and therefore their melting points, enthalpy, and/or heat storage capacity can change as these sugar alcohols are cyclically heated/melted and cooled/solidified.

The sugar alcohol 54 can be provided on the fabric base 52 in several ways. In one example, the sugar alcohol 54 is melted in a bath and the fabric base 52 passed therethrough, thereby allowing the fabric to adsorb the molten sugar alcohol. The fabric base 52 is then removed from the molten sugar 30 bath and cooled to form the thermal storage device 50. As the thermal storage device 50 cools, the liquid sugar alcohol 54 within the fabric base 52 solidifies and retains the shape of the fabric fibers. Surface tension in the sugar alcohol may allow it to solidify within some or all of the gaps between fibers in the fabric base 52. Regardless, the cooled thermal storage device 50 can then be rolled up or sheeted.

In another example, a solvent is used to dissolve the sugar alcohol 54 into the fabric base 52. In this configuration, the fabric base 52 is initially passed through a cooled or room temperature solvent/sugar alcohol 54 solution to soak the fabric base therein. The soaked fabric base 52 is then heated until the solvent is evaporated out, thereby leaving only the sugar alcohol 54 behind on the fabric base 52 to form the thermal storage device 50, which is then cooled and processed as described above.

It is desirable for the phase-change material 54 to be uniformly distributed throughout the fabric base 52 regardless of the process used to form the thermal storage device 50. To this end, providing sugar alcohol 54 onto/into the fabric base 52 can be enhanced by burning off any binders, lubricants, anti-static agents, and/or other coatings commonly used during manufacture of the fabric base 52. The burning off is performed prior to applying the sugar alcohol 54 onto the fabric base 52. This is particularly advantageous when the fabric base 52 is fiberglass.

When a fiberglass fabric base 52 is infused with sugar alcohol 54 surface tension is utilized to retain the sugar alcohol within the fabric structure. The expansion and contraction of the sugar alcohol 54 during heating and cooling is therefore confined to the volume of the fabric base 52. As a result, the volume of the thermal storage device 50 does not change during cyclical heating and cooling when fiberglass is used for the fabric base 52.

In any case, the fabric base 52 chosen should have a melting temperature, decomposition temperature, and/or auto-ignition temperature above the melting point of the selected phase-change material 54 such that only the phase-change material 54 is physically affected during operation of the apparatus 10. The fabric base 52 should also be capable of adsorbing over about 0.25 ounces of phase-change material 54 per cubic inch of fabric. The volume of the phase-change material 54 can form, in one example, at least 50% of the total composite volume of the thermal storage device 50. The respective volumes of the fabric base 52 and phase-change material 54 are each calculated using measured weights along with the published densities of the components.

Figure 6:
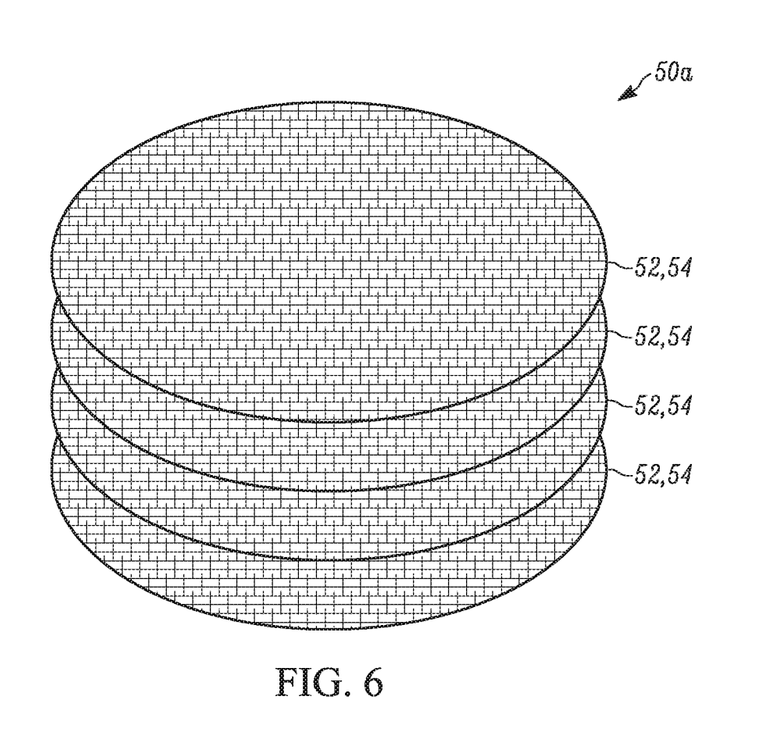
FIG. 6 illustrates multiple thermal storage devices.

Referring to FIG. 5, the thermal storage device 50 can be formed from a single layer of the fabric base 52. Alternatively, a thermal storage device 50a can be formed from multiple fabric base 52 layers (FIG. 6) secured together in an overlying manner to form a thicker composite material/thermal storage device. In both instances, each layer in the thermal storage device 50, 50a can have a thickness on the order of about 0.005" to about 0.25", but could be thicker depending on the fabric material(s) used.

Figure 7:
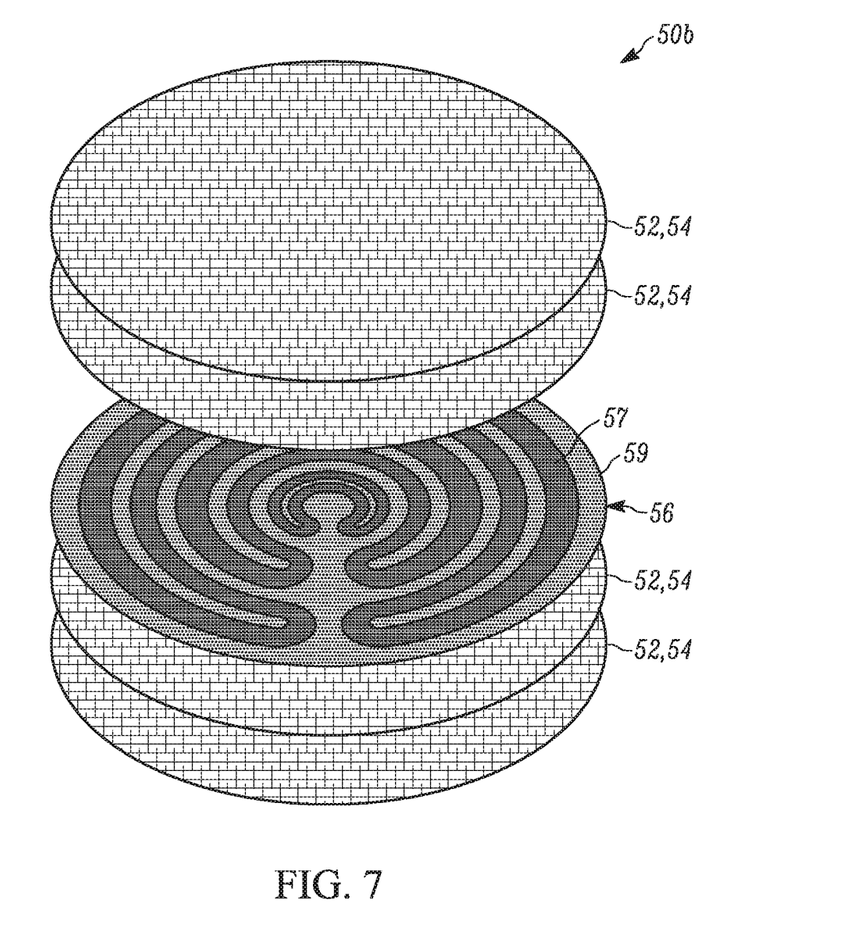
FIG. 7 illustrates a first resistive heating element between multiple thermal storage devices.

One or more resistive heating elements 56 or 58 can be positioned between multiple fabric base 52 layers to enable charging of a heat retentive product. In FIG. 7, the thermal storage device 50b includes a single resistive heating element 56 formed from a flexible graphite, thin film heater and positioned between adjacent fabric base 52 layers. More specifically, the resistive heating element 56 is an etched metal-type, thin film heater 57 insulated with silicone, polyimide, or another polymer film 59.

Alternatively, the resistive heating element 56 can constitute a screen-printed or conductive ink heater which can be self-regulating and have a positive temperature coefficient of resistance (not shown). In any case, the resistive heating element 56 can have a large surface area, e.g., comparable to the footprint of the fabric base 52, to enable fast, even heating of the sugar alcohol 54 throughout the fabric base.

Figure 8:
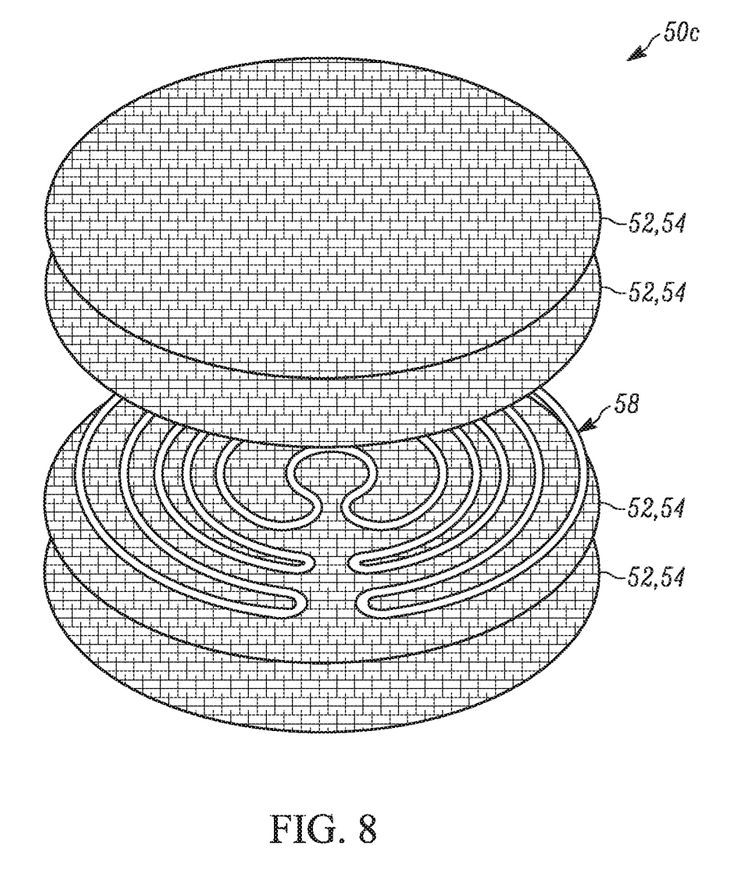
FIG. 8 illustrates a second resistive heating element between multiple thermal storage devices.

In the thermal storage device 50c shown in FIG. 8, the resistive heating element 58 is a wire, cartridge or calrod-style heater positioned between adjacent fabric base 52 layers. The resistive heating element 58 can have a smaller footprint than the fabric base 52. In both thermal storage devices 50b, 50c, the resistive heating elements 56, 58 are specifically provided to heat the sugar alcohol 54 in the fabric base 52 layers. It will also be appreciated that either resistive heating elements 56, 58 can be implemented into the single layer thermal storage device 50 (not shown).

With any of the aforementioned the thermal storage devices 50-50c, it can be desirable to encapsulate or contain the sugar alcohol 54 within the fabric base 52 to prevent any loss of the sugar alcohol during melting/cooling, and to help prevent delamination of the composite material. This is particularly desirable when mechanical abuse and moisture retention in the composite material/thermal storage device are a concern. To this end, since sugar alcohol 54 is water soluble, it can be desirable to isolate the thermal storage device 50-50c from sources of moisture to prevent the reduction of thermal storage capacity in the thermal storage device. This can be accomplished by laminating, coating or otherwise providing non-porous materials or layers (not shown) around the thermal storage device 50-50c. The non-porous material can also be vacuum bagged (vacuum sealed in a poly-bag) to provide containment of the thermal storage device 50-50c against moisture.

Although the thermal storage devices 50-50c shown and described are all disc-shaped and substantially planar, it will be appreciated that the thermal storage devices can be contoured or otherwise formed in any shape. For example, the thermal storage devices 50-50c can be formed into the same contour as the inner portion 30, e.g., arcuate or dome-shaped, such that the thermal storage device extends radially outward and downward along the inner portion towards the rubber foot 38.

Referring back to FIGS. 1 and 4, the heat spreader 60 is provided between the thermal storage device 50 and the inner portion 30 and helps improve the evenness of heating by and of the thermal storage device. The heat spreader 60 is made from any one or more materials having a high thermal conductivity greater than about 5 W/mK, e.g., aluminum, natural graphite, flexible graphite, graphitized organic films (such as polyimide), carbonized organic polymers (such as polyacrylonitrile), conductive inks or coatings, metal foils/sheets, and combinations thereof. The thickness of the heat spreader 60 needed is inversely proportional to its thermal conductivity.

Figure 9:
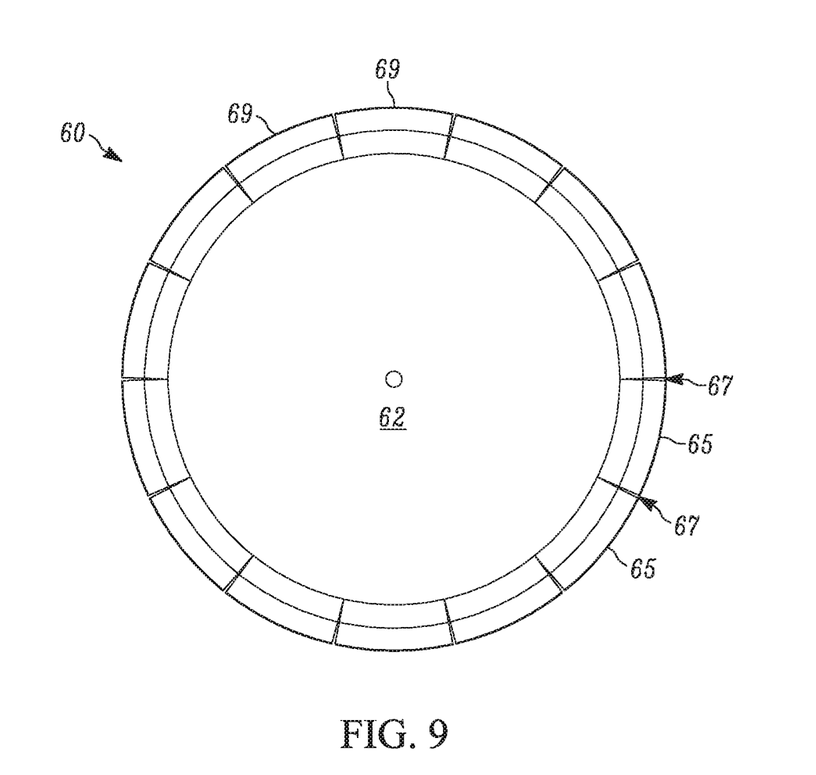
FIG. 9 is a top view of an example heat spreader of the food delivery apparatus of FIG. 1.

Referring to FIG. 9, the heat spreader 60 includes a planar base 62 and a flexible skirt 64 extending outward from and around the base. As shown, the skirt 64 is annular and includes a plurality of fingers 65 separated by slots 67 that allow the skirt to flex. The fingers 65 may include circumferentially extending bend lines or reduced thickness portions 69 to facilitate bending of the fingers when contoured around the inner portion 30.

When the food delivery apparatus 10 is assembled, the base 62 of the heat spreader 60 abuts the outer surface 32 of the inner portion 30 and the thermal storage device 50, but can alternatively be spaced from either or both the outer surface and thermal storage device (not shown). The skirt 64 extends downward and outward from the base 62 between the surfaces 26, 32 towards the rubber foot 38. In other words, the heat spreader 60 is contoured into a non-planar shape, e.g., dome-shaped mimicking the contour of the inner portion 30. To this end, the heat spreader 60 can be stamped, molded, cut, and/or wrapped around the geometry of the inner portion 30. The inner portion 30 can also act as a heat spreader (in lieu of or in addition to the heat spreader 60) when formed from a highly thermally conductive material.

In operation, the thermal storage device 50-50c can be heated by any one or more of conduction, convection or radiation and, thus, can be heated by ovens, heat-lamps, hot air blowers, hot plates or other heating devices. The thermal storage device 50-50c can also be bonded to an induction-heatable material to enable induction heating of the sugar alcohol 54. The induction-heatable material can constitute flexible graphite or another metal.

The thermal storage device 50-50c can also be heated or charged indirectly by directly heating the inner portion 30 such that heat transfers through the inner portion, into the chamber 37, and ultimately to the thermal storage device. To this end, the inner portion 30 can be heated by any conventional means.

The apparatus 10 can be configured to be used in a variety of thermal storage or heat retention devices. In one instance, the components forming the thermal storage device 50-50c layer(s) can be chosen to be non-toxic and safe for use in food service or medical industries. Common applications include food delivery, therapeutic devices, personal garment warming, medical applications (sterilization), and defrosting uses.

Figure 10:
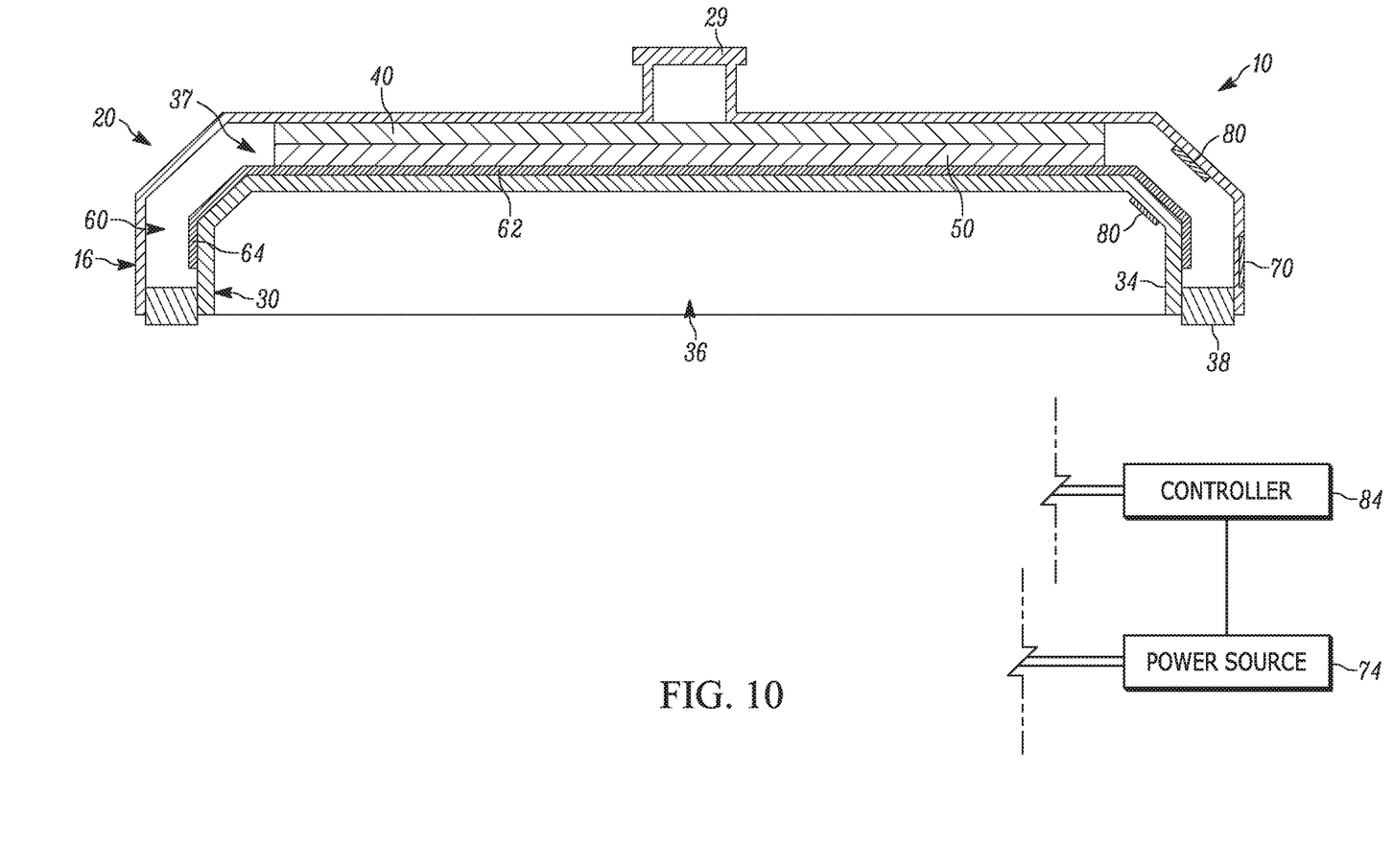
FIG. 10 is a schematic illustration of heating the food delivery apparatus.

Referring to FIG. 10, the apparatus 10 is charged or otherwise heated such that the thermal storage device(s) 50 therein is heated to a desired temperature, which can be measured and monitored with temperature sensors 80 within the apparatus, e.g., within the chamber between the outer portion 20 and inner portion 30 and/or along the inner surface 34 of the inner portion 30.

Each thermal storage device 50 is electrically connected to an electrical connector 70 provided in the shell 16 and exposed through the outer portion 20. A power source 74 is plugged into or otherwise connected to the connector 70 for providing power to the thermal storage device 50. A controller 84 is electrically connected to the power source 74 for controlling the supply of power to the shell 16. Each temperature sensor 80 is electrically connected to the controller 84 and continuously supplies signals to the controller indicative of the temperature within the chamber 37 and/or within the interior space 36. The controller 84 relies on these signals to control the power source 74, thereby precisely controlling heating of the thermal storage device 50. It will be appreciated that where multiple layer thermal storage devices are provided within the shell 16, the controller 84 can individually control the current supplied by the power source 74 to each layer of the thermal storage device to increase the versatility and degree of control in the apparatus 10.

Figure 11:
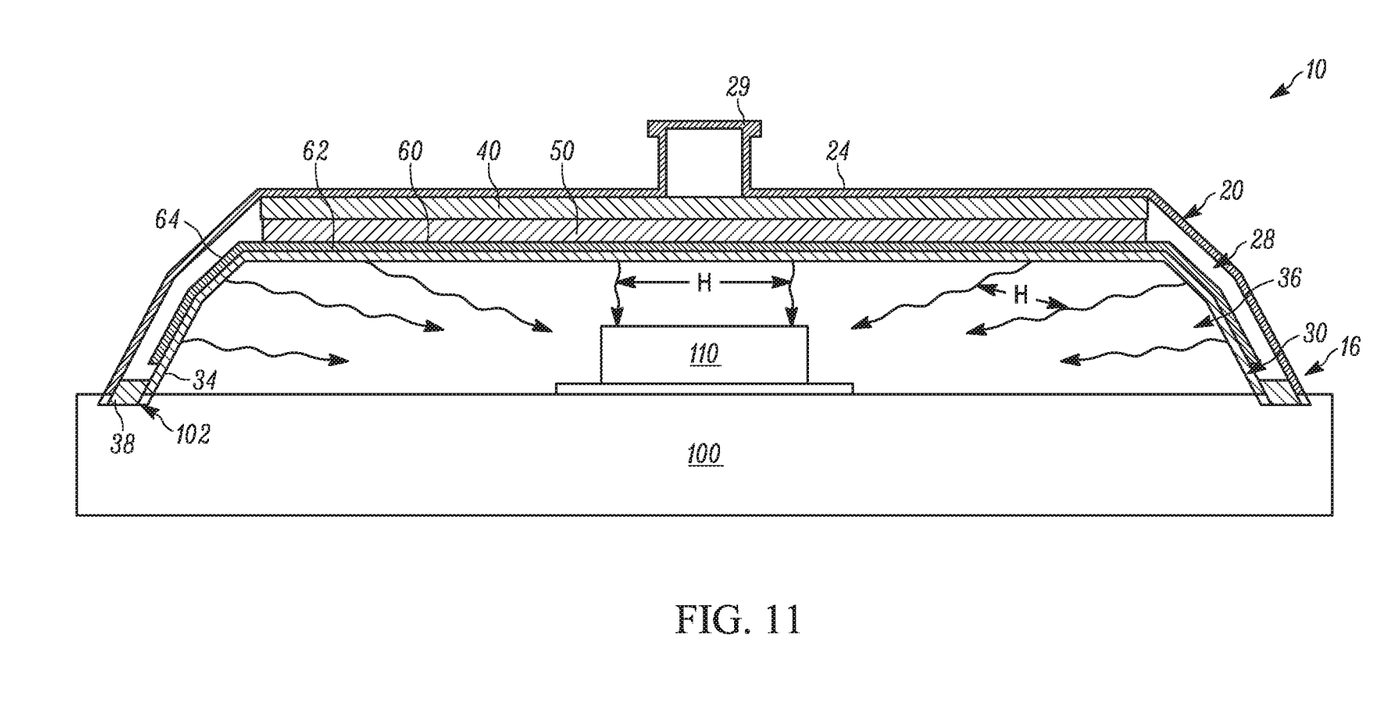
FIG. 11 is a schematic illustration of the food delivery apparatus of FIG. 1 heated and in use.

In a food delivery apparatus 10 example shown in FIG. 11, a heated plate of food 110 is placed on a table or other movable base 100. The apparatus 10 is configured to mate with the base 100 to form a secure connection therebetween. In one example, the rubber foot 38 cooperates with a mating slot 102 in the base 100 to help prevent relative movement between the apparatus 10 and the base. Additionally, the rubber foot 38 acts as a seal between the apparatus 10 and the base 100 to help prevent/mitigate thermal loss from the interior space 36 to outside the apparatus.

The apparatus 10 is heated as described and placed over food 110 on the base 100 to position the food within the interior space 36 of the inner portion 30. The charged thermal storage device 50 radiates heat H, which emanates both downward and inward from the sides of the apparatus 10 towards the food 110. More specifically, as the melted sugar alcohol 54 cools, the thermal storage device 50 radiates heat, which conducts through the inner portion 30 to the interior space 36. As shown in FIG. 11, the heat H radiates both downward through the planar section of the inner portion 30 as well as laterally through the curved sidewall of the inner portion. The inner portion 30 can be specifically tailored to facilitate heat conduction to the interior space 36. For example, the thickness of the inner portion 30 can be reduced in areas where rapid heat conduction is desired, e.g., adjacent the heat spreader 60. The material of the inner portion 30 can also be selected to facilitate rapid heat transfer therethrough.

Figure 12:
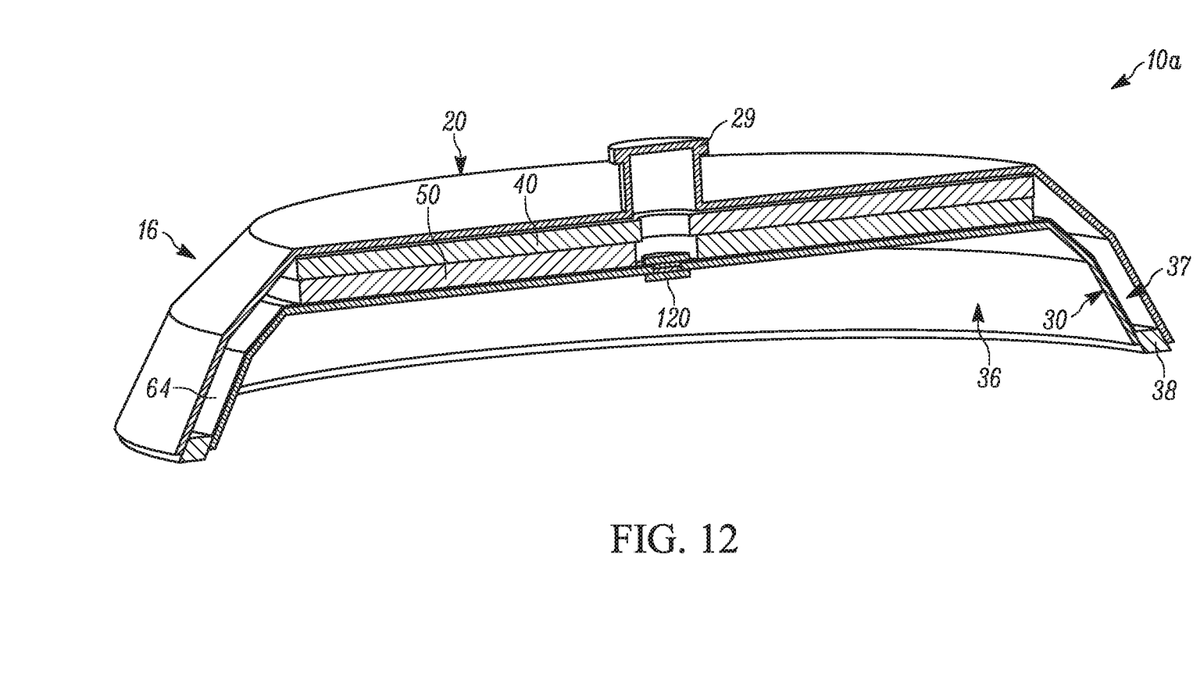
FIG. 12 is a side section view of a food delivery apparatus including a thermally conductive filler material.

As shown in FIG. 12, in another example food delivery apparatus 10a includes a thermally conductive filler material is added to certain areas of the inner portion 30. In one example, a metallic component 120 such as a rivet or similar device can extend through the inner portion 30 at a position adjacent the thermal storage device 50. The metallic component 120 can be molded, glued or otherwise assembled with the inner portion 30. In operation, the metallic component 120 acts expedite heat transfer from the thermal storage device 50 to the inner surface 34 of the inner portion 30, which is subsequently radiated to the interior space 36. The metallic component 120 can also be connected to the temperature sensor 80 (see FIGS. 10-11) for monitoring and controlling the temperature within the interior space 36.

Figure 13:
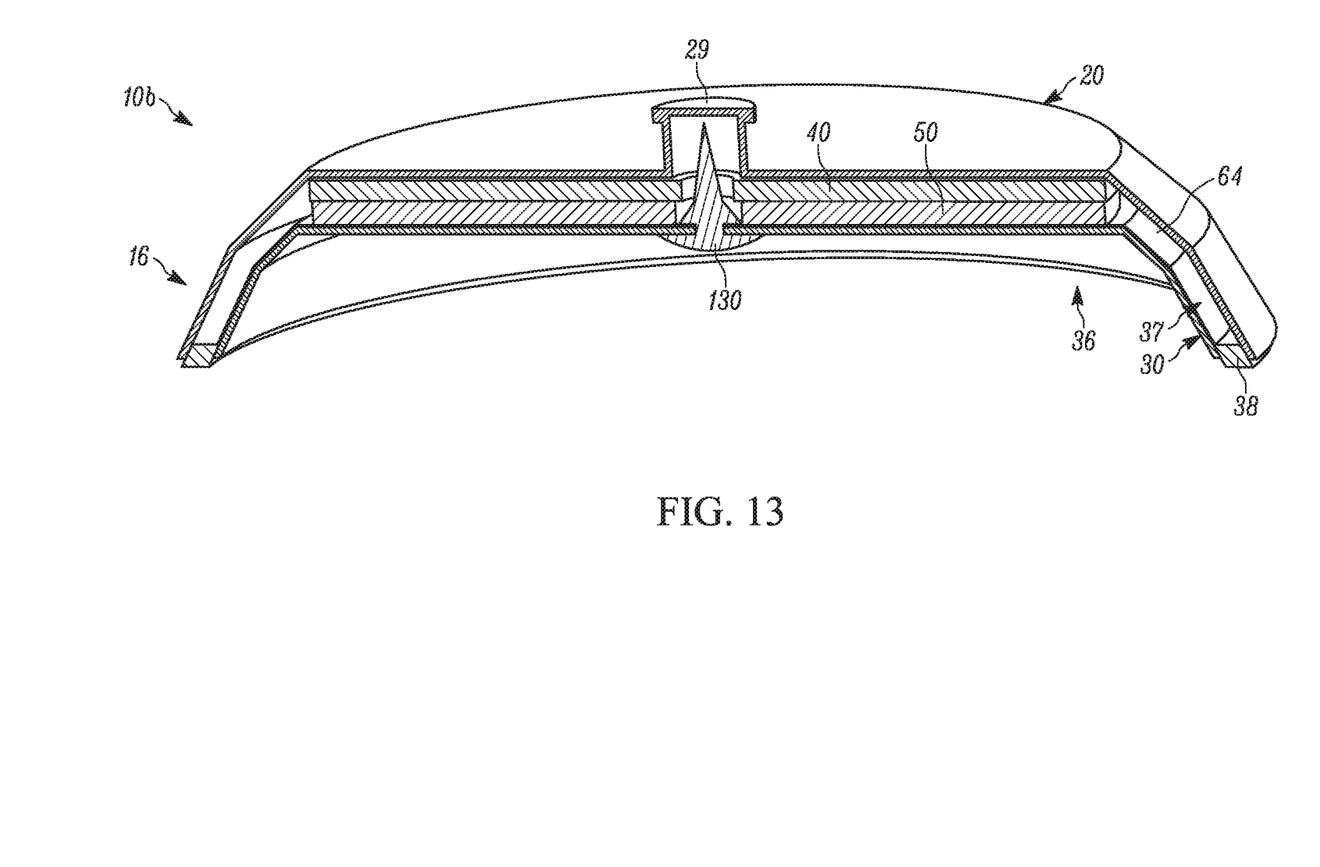
FIG. 13 is a side section view of a food delivery apparatus including a unidirectional pressure relief valve.

As shown in FIG. 13, another example food delivery apparatus 10b includes one or more unidirectional vents 130, e.g., an umbrella vent, to help relieve pressure buildup within the chamber. In operation, excess pressure built up within the chamber 37 passes through the vent 37 and into the interior space 36.

The food delivery apparatus described herein is advantageous for several reasons. First, the heat spreader helps to reduce or eliminate condensation on the inner surfaces of the inner portion and helps to more efficiently dissipate thermal energy from the thermal storage device to the food. Both advantageously help improve food quality and help maintain food at the desired temperature for a longer period of time.

The heat spreader also advantageously helps prevent thermal degradation of the sugar alcohol and/or the fabric base, increasing the useful life of the food delivery device. The heat spreader can also help account for application dependant thermal load variations during operation by acting quickly to distribute the thermal load, thereby keeping the food delivery apparatus temperature more even.

The food delivery apparatus also extends the period of time where hot food can be held at a safe and pleasing temperature, e.g., by removing moisture and maintaining heat. As a result, hot food preparation timing can be made less critical, and hot food can be delivered over longer periods of time, all while keeping the food at the proper temperatures.

Moreover, the food delivery apparatus described herein has fewer components than conventional food delivery systems by eliminating the need for a specific food tray and/or separate thermal energy storage device.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A food delivery apparatus comprising:
a domed shell defining an interior space;
a thermal storage device secured to the shell so as to direct heat downward to food within the interior space, wherein the thermal storage device comprises a fabric base and a phase-change material provided on the base for storing and releasing heat applied to the thermal storage device; and
a thermal heat spreader separate from the domed shell, the thermal heat spreader being positioned adjacent the thermal storage device for providing uniform heat from the thermal storage device to the interior space, wherein the heat spreader has a surface area facing the interior space that is larger than a surface area of the thermal storage device facing the interior space wherein the thermal storage device has an uninterrupted interface with the heat spreader between a central portion of the thermal storage device and a perimeter thereof.

2. The apparatus of claim 1, wherein the heat spreader comprises flexible graphite abutting the domed shell.

3. The apparatus of claim 1, wherein the heat spreader includes a planar base and a skirt having a plurality of fingers separated by slots and extending radially outward from the base at an angle relative to the base.

4. The apparatus of claim 1, wherein the heat spreader is positioned between the thermal storage device and the interior space.

5. The apparatus of claim 1, wherein the phase-change material is absorbed into the fabric base.

6. The apparatus of claim 5, wherein the fabric comprises at least one of fiberglass, carbon fiber, silica, cotton, polyester, wool, linen, acrylic, aramid, basalt, and nylon.

7. The apparatus of claim 5, wherein the phase-change material is a sugar alcohol comprising at least one of methanol, arabinitol, erythritol, fucitol, galactitol, dulcitol, iditol, inositol, isomalt, lactitol, lactitol monohydrate, maltitol, maltotetritol, mannitol, palatinitol, pentaerythritol, polyglycitol, ribitol, sorbitol, threitol, volemitol, and xylitol.

8. The apparatus of claim 1, wherein the domed shell includes an inner portion and an outer portion secured together to encapsulate the thermal storage device.

9. The apparatus of claim 1 further comprising a thermal insulation layer with the thermal storage device being positioned between the thermal insulation layer and the interior space.

10. The apparatus of claim 9, wherein the thermal insulation layer comprises at least one of foam rubber, expanded urethane foam, fiberglass insulation, and silica cloth.

11. The apparatus of claim 1 further comprising an elastomeric foot secured to the domed shell for preventing movement relative to the food.

12. The apparatus of claim 1, wherein:
the domed shell has an inner portion and an outer portion secured together to define a chamber therebetween, the inner portion defining the interior space;
the thermal storage device is positioned in the chamber so as to direct heat downward to food within the interior space;
the heat spreader is positioned between the inner portion and the thermal storage device for evenly distributing heat downward from the thermal storage device to the food; and
a thermal insulation layer is positioned between the outer portion and the thermal storage device.

13. The apparatus of claim 12, wherein the heat spreader comprises flexible graphite abutting the inner portion of the domed shell.

14. The apparatus of claim 13, wherein the heat spreader includes a planar base and a skirt having a plurality of fingers separated by slots and extending radially outward from the base at an angle relative to the base.

15. The apparatus of claim 12, wherein the thermal storage device comprises a fabric base and a phase-change material provided on the base for storing and releasing heat applied to the thermal storage device.

16. The apparatus of claim 15, wherein the phase-change material is absorbed into the fabric base.

17. The apparatus of claim 15, wherein the fabric comprises at least one of fiberglass, carbon fiber, silica, cotton, polyester, wool, linen, acrylic, aramid, basalt, and nylon.

18. The apparatus of claim 15, wherein the phase-change material is a sugar alcohol comprising at least one of methanol, arabinitol, erythritol, fucitol, galactitol, dulcitol, iditol, inositol, isomalt, lactitol, lactitol monohydrate, maltitol, maltotetritol, mannitol, palatinitol, pentaerythritol, polyglycitol, ribitol, sorbitol, threitol, volemitol, and xylitol.

19. The apparatus of claim 18, wherein the thermal insulation layer comprises at least one of foam rubber, expanded urethane foam, fiberglass insulation, and silica cloth.

20. The apparatus of claim 12 further comprising an elastomeric foot secured to the domed shell between the inner portion and the outer portion for preventing movement of the dome relative to the food.

21. The apparatus of claim 12, wherein the heat spreader has a thermal conductivity greater than about 5 W/mK.

22. The apparatus of claim 12, wherein the heat spreader is metallic.

23. The apparatus of claim 2, wherein the heat spreader has a thermal conductivity greater than about 5 W/mK.

24. The apparatus of claim 2, wherein the heat spreader is metallic.

25. The apparatus of claim 1, wherein the domed shell is centered about a centerline and the heat spreader extends outward of the thermal storage device relative to the centerline.

26. The apparatus of claim 1, wherein the heat spreader distributes heat from the thermal storage device in a manner that substantially prevents condensation on an inner surface of the domed shell.

27. The apparatus of claim 1, wherein the domed shell is ventless.

28. The apparatus of claim 1, wherein the heat spreader abuts an inner portion of the shell defining the interior space and the thermal storage device is positioned between the heat spreader and a thermal insulation layer.

29. The apparatus of claim 1, wherein the domed shell includes an inner surface defining the interior space, and wherein the thermal storage device extends parallel to the inner surface a first distance and the heat spreader extends parallel to the inner surface a second distance greater than the first distance.

30. The apparatus of claim 1, wherein the domed shell includes a top wall and a side wall extending downward from the top wall, the thermal storage device extending only along the top wall and the heat spreader extending along both the top wall and the side wall.

31. The apparatus of claim 1, wherein the heat spreader consists of flexible graphite abutting the domed shell and the thermal storage device.

32. The apparatus of claim 1, wherein within a perimeter of the thermal storage device, the thermal storage device and the heat spreader have the same shape.

* * * * *